United States Patent
Chang et al.

(10) Patent No.: US 7,484,006 B2
(45) Date of Patent: Jan. 27, 2009

(54) SYSTEM AND METHOD FOR SERVER NETWORK CONFIGURATION AND ADDRESSING

(75) Inventors: Shean-Guang Chang, Morris Plains, NJ (US); Tom Barnes, Whitehouse Station, NJ (US)

(73) Assignee: Bea Systems, Inc., Redwood Shores, CA (US)

( * ) Notice: Subject to any disclaimer, the term of this patent is extended or adjusted under 35 U.S.C. 154(b) by 574 days.

(21) Appl. No.: 10/368,927

(22) Filed: Feb. 19, 2003

(65) Prior Publication Data

US 2003/0163523 A1 Aug. 28, 2003

Related U.S. Application Data

(60) Provisional application No. 60/359,132, filed on Feb. 22, 2002.

(51) Int. Cl.
G06F 15/16 (2006.01)
(52) U.S. Cl. .................. 709/246; 709/228; 709/245; 370/254
(58) Field of Classification Search .................. 709/223, 709/224, 238, 245, 227, 250, 217, 246, 228; 370/254
See application file for complete search history.

(56) References Cited

U.S. PATENT DOCUMENTS

| | | | |
|---|---|---|---|
| 6,006,259 A | 12/1999 | Adelman et al. ............ 709/223 |
| 6,078,957 A | 6/2000 | Adelman et al. ............ 709/224 |
| 6,286,052 B1 | 9/2001 | McCloghrie et al. ........ 709/238 |
| 6,411,506 B1 | 6/2002 | Hipp et al. .................. 361/686 |
| 6,470,389 B1 | 10/2002 | Chung et al. ................ 709/227 |
| 6,490,632 B1 | 12/2002 | Vepa et al. .................. 709/250 |
| 6,560,630 B1 | 5/2003 | Vepa et al. .................. 709/105 |
| 6,567,377 B1 | 5/2003 | Vepa et al. .................. 370/230 |
| 6,714,987 B1* | 3/2004 | Amin et al. .................. 709/249 |
| 7,200,110 B1* | 4/2007 | Burns et al. .................. 370/225 |
| 2002/0188665 A1* | 12/2002 | Lash ............................ 709/203 |
| 2003/0065784 A1* | 4/2003 | Herrod ......................... 709/227 |
| 2003/0179758 A1* | 9/2003 | Furukawa et al. ........... 370/397 |
| 2004/0111523 A1* | 6/2004 | Hall et al. .................... 709/230 |
| 2004/0162901 A1* | 8/2004 | Mangipudi et al. .......... 709/225 |

* cited by examiner

*Primary Examiner*—William C Vaughn, Jr.
*Assistant Examiner*—Djenane M Bayard
(74) *Attorney, Agent, or Firm*—Fliesler Meyer LLP

(57) ABSTRACT

A system and method for supporting multiple network interface cards, network addresses, or ports for a single instance of a server, such as an application server. The benefits of this are realized in various areas such as traffic isolation, traffic prioritization, network redundancy, and application segregation or virtual host support. Another benefit is the ability to allow multiple servers in a cluster to listen on the same address by using different ports. The system supports logical isolation, by allowing a server to listen on multiple ports; and physical isolation, by allowing a server to listen on multiple IP addresses.

22 Claims, 1 Drawing Sheet

Channel_A:OutgoingEnabled = false, edge channel for Server 1, Server 2 & Server 3
Channel_B:OutgoingEnabled = true, common channel between Server 1 and Server 3
Channel_C:OutgoingEnabled = true, common channel between Server 2 and Server 3

SYSTEM AND METHOD FOR SERVER NETWORK CONFIGURATION AND ADDRESSING

CLAIM OF PRIORITY

This application claims priority from provisional application "SYSTEM AND METHOD FOR SERVER NETWORK CONFIGURATION AND ADDRESSING" Application No. 60/359,132 filed Feb. 22, 2002, and which application is incorporated herein by reference.

FIELD OF THE INVENTION

The invention is related to a system and method for server network configuration and addressing that allows for supporting multiple network interface cards with a single instance of a server.

BACKGROUND

Current Java-based application server implementations have a singleton implementation for network connectivity in the Remote Java Virtual Machine (RJVM) layer. This restriction forces the server to only communicate over a single Network Interface Card (NIC) and also forces all traffic in the same Quality of Service (QOS) level (e.g. t3, http, and IIOP) to share a single port. This causes problems with being unable to adequately isolate or prioritize traffic, a desirable goal in such distributed environments. The requirement of having to use a single NIC also causes problems in having little support for network redundancy.

SUMMARY

The invention allows for supporting multiple network interface cards (NIC) for a single instance of a server, such as for example a WebLogic server. The benefits of this are realized in various areas such as traffic isolation, traffic prioritization, network redundancy, and application segregation (virtual host support). Another benefit is the ability to allow multiple servers in a cluster to listen on the same address by using different ports. This work is intended to enable logical isolation, by allowing a server to listen on multiple ports; and physical isolation, by allowing a server to listen on multiple IP addresses. Although the invention is described primarily with respect to WebLogic server (WLS) examples, it will be evident to one skilled in the art that the teachings herein may be applied to other server types and server implementations.

DETAILED DESCRIPTION

Figure 1:
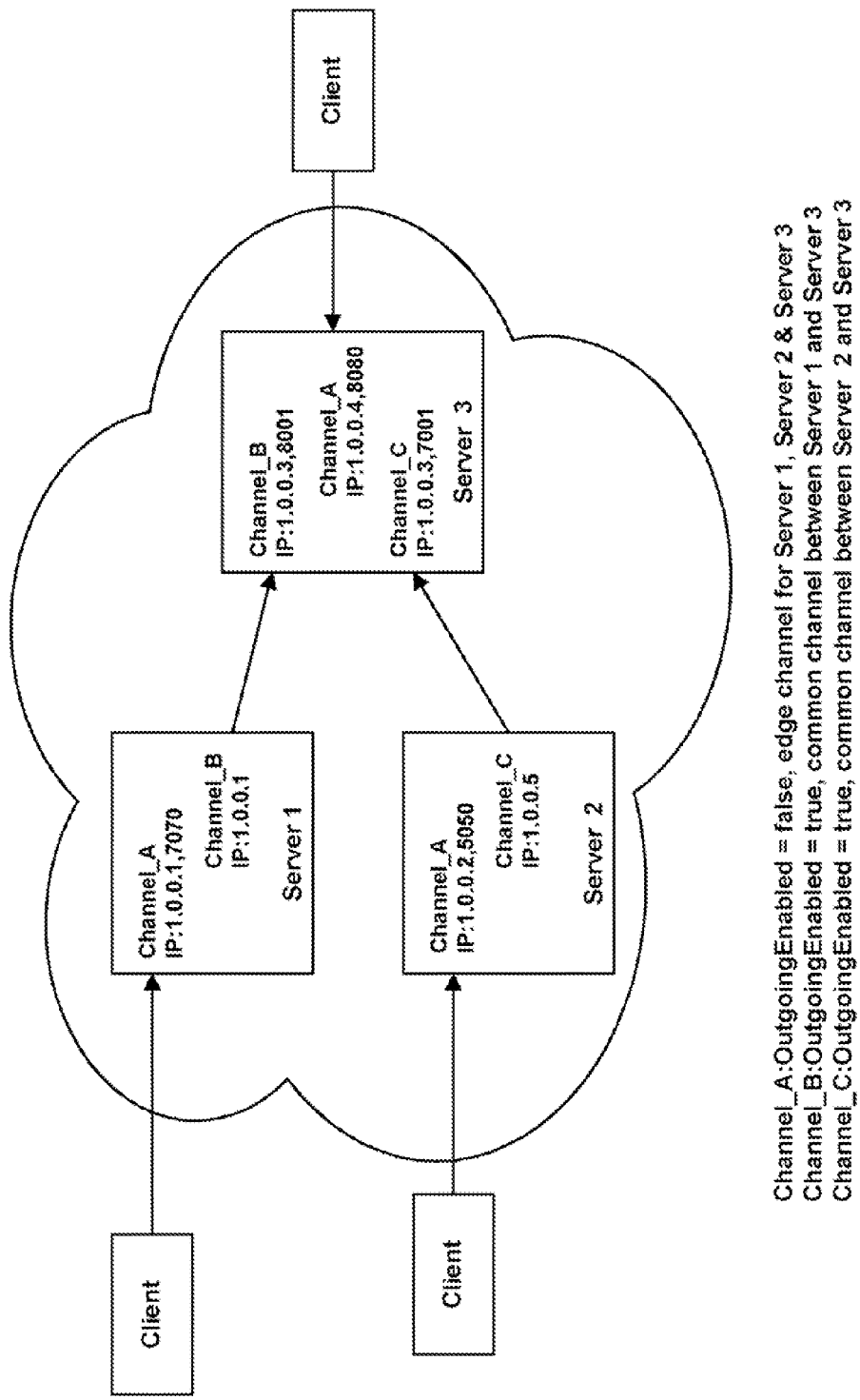
FIG. 1 shows an illustration of a server having multiple channels in accordance with an embodiment of the invention.

The invention described herein focuses on lower layer functionality, specifically the RJVM level, to abstract out the relationship between the server and the physical networking characteristics of the server. In the context of this document, the terms server and RJVM are used interchangeably. For client to server and server-to-server communications we are talking about the RJVM. For configuration NAP and channel we are talking about the server. Some special cases such as using an URL to establish connection we will discuss it separately.

The current WebLogic server, for example, has a singleton implementation for network connectivity in the RJVM layer. This restriction forces the server to only communicate over a single NIC. All traffic in the same QOS level (e.g. t3, http, and IIOP) must share a single port. To take advantage of the hardware resources such as multi-homed configuration, application servers developed in accordance with the invention do not suffer from these limitations. In accordance with the invention, a new layer beneath RJVM is added to take advantage of the multi-homed configuration by allowing controlled communication over multiple NICs and allowing protocols to share or exclusively own one or more NAPs. Multiple servers can be deployed in a cluster on a single IP machine by using different parts for each server.

Introduction

A server is like a location off of a highway. A "Channel" can be thought of as a highway and a "Network Access Point" (NAP) as an on-ramp on that highway. To link two locations, they both need to share a channel. A NAP is optional, and is used by a server to over-ride channel settings on a per server basis. A server may access multiple channels and multiple NAPs. No two NAPs on the same server may refer to the same channel. For interoperability reasons, the network related fields from previous versions continue to be supported. In this document, these legacy fields are referred to as the "default channel" and the "default admin channel".

FIG. 1 shows an example of a multiple channel configuration in accordance with an embodiment of the invention. In the example shown in FIG. 1, a plurality of servers: server 1, server 2, and server 3, are shown; communicating with one another over a plurality of channels: channel A, channel B, and channel C. The servers serve a plurality of clients. In this example channel A is configured for traffic with connections in the in-bound direction only (i.e. OutgoingEnabled=False), and is effectively being used as an edge channel for server 1, server 2, and server 3. Channel B is a common channel between server 1 and server 3. Channel C is a common channel between server 2 and server 3. Depending on the implementation, multiple IP addresses can be used on each machine, and/or alternatively a single IP address can be used with multiple ports.

Configuration Suitability

Configuring multiple servers in a cluster with differing listen ports may not be suitable for some configurations. Production configurations sometimes take advantage of DNS round-robin or hardware load balancing. These techniques require that all servers set their ports to be the same. This is because the load balancer chooses a target server based on address not on port. Among other added capabilities, the invention provides the ability for multiple servers within the same cluster to listen on the same listen address but at different ports. This is accomplished by configuring a multicast port on the cluster mbean. Previously, a cluster's multicast port was inferred by each individual server's listen port, which forced each server to configure the same listen port in order to participate in a cluster. Setting the cluster multicast port allows servers to participate in a cluster despite having different listen ports. This in turn allows multiple servers in a cluster to share the same listen address, as now they will not collide attempting to use the same port on the same listen address.

Internally Constructed URLs

Internally constructed URLs limit network partitioning of server to server traffic. Multiple locations within the server code "manually" construct server URLs for purposes such as replication, JDBC operation, admin server operation, and JTA operation. These URLs will continue to depend on the listen port of the "default channel" and "default admin channel" (describe below). The side effects of this are: internal traffic may not take advantage of configured channels, which limits partitioning of server-to-server network traffic; and, servers cannot be configured without at least one plain text port.

In describing the invention, we concentrate herein on "client cases", where URLs are passed to a client for purposes of reconnecting back into an application. An example of this is EJB home handles. An issue here is how to ensure URLs are properly downgraded when new servers pass them back to older clients. The new server field, ServerMBean.DefaultURLLocalAddress, partially mitigates the issue of traffic isolation. It forces all new connections initiated on a server via an URL to bind to a local address. This setting is less flexible than a channel based solution that could partition traffic across multiple local IP addresses rather than just one.

1. Network Address Point (NAP)

In traditional server mechanisms, a single ServerMBean defines:

A value for setting up a single port to accept incoming connection requests for T3, HTTP, IIOP and HTTP tunneling for T3.

A flag to disable HTTP tunneling for T3.

Optionally defines a value for setting up a different port to accept incoming connection requests for T3S, HTTPS, IIOPS and HTTPS tunneling for T3I.

Optionally defines a value for setting up another different port to accept incoming connection requests for Admin traffic.

Some of the configuration fields are shared among all of the port setup such as login timeout and accept backlog, and other fields may apply to the NIC hosting those ports such as the external DNS name. To support a maximum of three ports over a single NIC, a single ServerMBean may not be too bad. However, to support multiple NICs with the potential for a sizable amount of ports on each NIC a single ServerMBean does not scale for the job. Also, fine-tuning for each port is not possible using a single ServerMBean. For this reason the notion of network access points (NAPs) and channels are introduced.

A NAP is the network resource on which the server will listen to conduct network communication by accepting the incoming TCP/IP connection request. A WebLogic server may have multiple NAPs. A NAP defines a set of listen ports and a single listen address which, when combined, specify a network access point that is unique to exactly one server. The NAP listen address also defines which NIC to use in a multi-home system (i.e. it used for the TCP/IP bind address).

A NAP encapsulates all the information for the port setup to a single entity. Each NAP must specify a channel. While a server may have multiple NAPs, no two NAPs on the same server may reference the same channel. Much of the defaults for NAP settings are tunable in the channel. Configuration at the channel layer allows uniform settings to apply to all member NAPs. A NAP may fine-tune (over-ride) most channel settings, but may not disable any protocol or QOS the channel supports. A server may have multiple channels targeted at it, but NAPs are not needed to listen on these channels. A NAP is not needed if there is no attribute in the channel that needs to be fine-tuned at the server level.

Each NAP port has a dedicated thread listening on it (ListenThread). The NAP not only specifies the network resource that a server uses for listening, but also implicitly specifies how the server initiates outgoing connection requests for its channel. However, to facilitate NAPs that are intended for serving incoming traffic only (such as an http port), the channel has a flag for disabling NAPs from using it for initiating outgoing connections.

By default, the NAP listen address is used for the TCP/IP local (NIC) address when a server is initiating contact with a remote server. This can be disabled at the channel level. The benefits of defining an outgoing address in a multi-homed situation is that it allows directing the traffic going out to a particular network served by a particular NIC and also from the security viewpoint, such as firewalls which sometime want to filter IP traffic not just by destination IP but also by source IP.

The NAP listen address optionally does double duty as the outgoing address to simplify configuration and to make it more intuitive. In future releases the option is open to allow the outgoing address and port to be specified separately.

NetworkChannel

This attribute is a reference to a valid channel to which this NAP is attached. If a valid channel is not supplied the NAP will be ignored and a log message will be generated.

ListenAddress

The ListenAddress has the same syntax and semantics as the ListenAddress in the existing ServerM Bean except that it applies to the NAP, not the ServerMBean. If not specified then the listen address from the ServerMBean is used. If neither the NAP or the server mbean supply a listen address, the loopback address (localhost address) will be used.

ListenPort/SecureListenPort

If specified, these settings override their values from the network channel. If the channel does not enable the port in question, the same field in the NAP is ignored. If not specified, then the NAP will inherit the value from the channel. Changing these values allows configurations of multiple servers listening on the same listen address. These values can be designed to have the same syntax and semantics as similar fields in the current server implementation. For example, in the context of WLS, the ListenPort has the same syntax and semantics as the ListenPort in the existing ServerMBean except that it applies to the NAP, not the ServerMBean. Similarly, the SecureListenPort maps to the ListenPort in the SSLMBean.

The ExternalDNSName

The ExternalDNSName has the same syntax and semantics as the External DNSName in the existing ServerMBean except that it applies to the NAP not the ServerMBean. This DNS name is the current singleton DNS name that is placed in the JVMID, the JVMID will now have a DNS name per NAP. It is only used for constructing http sessions. If the ExternalDNSName is not set, the ListenAddress is used in its place.

Fine-Tuning Fields
   LoginTimeoutMillis
   LoginTimeoutMillisSSL
   AcceptBacklog
   TunnelingClientPingSecs
   TunnelingClientTimeoutSecs
   MaxT3MessageSize
   MaxHTTPMessageSize
   MaxIIOPMessageSize
   CompleteT3MessageTimeout
   CompleteHTTPMessageTimeout
   CompleteIIOPMessageTimeout
   IdleIIOPConnectionTimeout DefaultIIOPPassword/DefaultIIOPUser If specified, these settings override their values from the network channel. If the channel does not enable the port in question, the same field in the NAP is ignored. If not specified, then the NAP will inherit the value from the channel.

External Software Interfaces

The following attributes are in the NetworkAccessPointMBean. A ServerMBean may reference zero or more NetworkAccessPointMBeans.

| Attribute | Default | Valid Views | Dynamic |
|---|---|---|---|
| AttachedChannel | None | A not empty String | False |
| ListenAddress | Null | Host name or dotted-string of a IP address Null: get it from ServerMBean | False |
| ListenPort | −1 | −1: get it from channel 1 to 65534 | False |
| SSLListenPort | −1 | −1: get it from channel 1 to 65534 | False |
| ExternalDNSName | None | None String | False |
| LoginTimeout-Millis | −1 | −1: get it from channel 0: disable 1 to 100000 | True |
| LoginTimeout-MillisSSL | −1 | −1: get it from channel 0: disable 1 to 100000 | True |
| AcceptBacklog | −1 | −1: get it from channel 1 to 2^31 −1 0 ? | False |
| TunnelingClient-PingSecs | −1 | −1: get it from channel 1 to 2^31 −1 0 ? | False |
| TunnelingClient-TimeoutSecs | −1 | −1: get it from channel 1 to 2^31 −1 0 ? | False |
| MaxT3MessageSize | −1 | −1: get it from channel 1 to 2^32 −1 | True |
| MaxHTTPMessageSize | −1 | −1: get it from channel 1 to 2^32 −1 | True |
| MaxIIOPMessageSize | −1 | −1: get it from channel 1 to 2^32 −1 | True |
| CompleteT3Message-Timeout | −1 | −1: get it from channel 0: wait indefinitely 1 to 2^32 −1 | True |
| CompleteHTTP-MessageTimeout | −1 | −1: get it from channel 0: wait indefinitely 1 to 2^32 −1 | True |
| CompleteIIOP-MessageTimeout | −1 | −1: get it from channel 0: wait indefinitely 1 to 2^32 −1 | True |
| IdleIIOPConnection-Timeout | −1 | −1: get it from channel 0: wait indefinitely 1 to 2^32 −1 | True |
| DefaultIIOPuser | Null | null: get it from channel string: default IIOP user | False |
| DefaultIIOPPassword | Null | null: get it from channel string: default IIOP password | False |

2. Channel

A channel can be thought of as a highway, and a NAP as an on-ramp on that highway. A channel is designed to allow simple configuration among multiple NAPs sharing the same kind of characteristics such as Port number, Timeout value, Protocol(s), etc. It also allows the server administrator to fine-tune the desired traffic flow among different protocols and/or different servers by ordering the target RJVM's NAPs in a preferred weighted list. A channel can be configured for inbound connections only, which is useful for edge servers. This allows configuring a separate channel just for accepting connections from clients but not from other servers. A channel can also restrict outgoing connections to be initiated from a specific NIC by using the local IP address associated with the local server's NAP. If a server has a NAP attached to a channel it is considered joined to the channel. No two NAPs on the same server may attach to the same channel. Each server can join multiple channels. Servers joining the same channel are considered to have a common channel.

To be compatible with previous server implementations/releases, embodiments of the invention may include backward compatible network related fields that are considered to be the "default channel". In these embodiments, these fields may continue to be configured separately from regular channels to support the singleton-like ServerMBean configurations. All servers joining the default channel are also considered having the common channel. All servers must join the default channel.

The scope of a channel is independent of domains, clusters, or configuration files. A single configuration file may have 0 or more channels. Each channel must have a unique name.

A new connection to a remote RJVM is only established if there is no existing connection with the desired QOS or higher. Existing connections with a higher QOS are used when there is no existing connection with the desired QOS. New connections are established with the desired QOS, not higher. Tunneling and non-tunneling are considered to be the same QOS, so that if a tunneled connection is already available for the desired protocol that connection is used. The same is true for the reverse.

All servers will require specifying a default channel. The default channel minimally sets a listen port or a ssl listen port as is defined today. Many fields specified in the NAP/channel also exist in the default channel. Although they serve a similar purpose, they are not the same mbeans and do not generally inherit each-others values. In addition, the default channel fields are spread throughout three mbeans: SSLMBean, ServerMBean, and KernelMBean.

If a new server-to-server connection is warranted, and the desired protocol is supported by multiple channels, the server administrator has a way to break the tie. The administrator can increase a channel's "weight" to bias the choice towards that channel. A new server-to-server connection is established using only the channels common between them that support the desired protocol and QOS and that furthermore are marked "OutgoingEnabled". Two channels match if and only if they have the same name and they have the same protocol and QOS settings. All channels are considered, this includes the default channel, the default admin channel, and configured channels. The remote server's default channel and admin channel are automatically considered to be common channels—even if they are not configured similarly locally. If there are multiple common channels, each is tried in turn until a successful connection occurs. The order that the channels are tried is based on their configured channel weight, where the default channel and default admin channel weights are always "50". Unsuccessful connects cause a channel to be marked unreachable. Unreachable channels will not be retried until all common channels are marked unreachable.

A new client-to-server connection is established in a similar way to a new server-to-server connection. A client has no local channel information to match against the server information, so all server channels are considered common. The following attributes are associated with the channel via the NetworkChannelMBean. There may be zero or more NetworkChannelMBeans in a domain. A NetworkChannelMBean is associated with a server by targeting it at that server or targeting it at the cluster of which the server is a member.

Channel Name

The channel name is the name of the mbean. This is unique within a configuration.

ListenPort/SSLListenPort

These have the same syntax and semantics as the similar fields in the ServerMBean and SSLMBean.

ListenPort/SSLListenPortEnabled

These attribute indicate whether or not the given port is enabled or not. The default is false.

TunnelingEnabled

This attribute indicates whether or not tunneling is supported. The default is false.

(T3|IIOP|HTTPD)[s]Enabled

This attribute indicates the protocols supported by this channel. The default is false. If all are false, the channel is ignored. Note that even if HTTPD is set to false it may still support the HTTP protocol if isIgnoringHttpdEnabled is true on the WebAppServletContext.

OutgoingEnabled

If OutgoingEnabled is true, then this channel will be considered when constructing an outbound connection. The default is true. This is not configurable on the default channel and the default admin channel. For these, it is always true.

BoundOutgoing

If true, then a new outgoing connection has to bind to the same IP address as the local NAP in the same channel from the same server. If false, the native OS will select an IP address to bind to. The default is false. (The default is false to correspond with current behavior).

ChannelWeight

This attribute is the channel weight value for the channel with higher value preferred. If not specified, then a default value of 50 will be assigned.

Additional Network Settings

The following channel mbean settings have the same semantics, default values, and ranges as the same named fields in the default channel's mbeans: ServerMBean, KernelMBean, and SSLMBean.

LoginTimeoutMillis
  LoginTimeoutMillisSSL
  AcceptBacklog
  TunnelingClientPingSecs
  TunnelingClientTimeoutSecs
  MaxT3MessageSize
  MaxHTTPMessageSize
  MaxIIOPMessageSize
  CompleteT3MessageTimeout
  CompleteHTTPMessageTimeout
  CompleteIIOPMessageTimeout
  DefaultIIOPUser
  DefaultIIOPPassword
  IdleIIOPConnectionTimeout External Software Interfaces The following attributes are members of the NetworkChannelMBean

| Attribute | Default | ValidViews | Dynamic |
|---|---|---|---|
| Name | None | A not empty String | False |
| ChannelWeight | 50 | 1 to 100 | False |
| ListenPortEnabled | False | "true" or "false" | False |

-continued

| Attribute | Default | ValidViews | Dynamic |
|---|---|---|---|
| ListenPort | 7001 | 1 to 65534 | False |
| SSLListenPortEnabled | False | "true" or "false" | False |
| SSLListenPort | 7002 | 1 to 65534 | False |
| TunnelingEnabled | False | "true" or "false" | False |
| (T3|IIOP|HTTP) [s] Enabled | False | "true" or "false" | False |
| OutgoingEnabled | True | "true" or "false" | False |
| BoundOutgoing | True | "true" or "false" | False |
| LoginTimeoutMillis | 5000 | 0: no timeout 0 to 100000 | True |
| LoginTimeoutMillisSSL | 25000 | 0: no timeout 0 to 2^31 −1 | True |
| AcceptBacklog | 50 | 0 to 2^31 −1 | False |
| TunnelingClientPingSecs | 45 | 0 to 2^31 −1 | False |
| TunnelingClientTimeoutSecs | 40 | 0 to 2^31 −1 | False |
| MaxT3MessageSize | 10000000 | 4096 to 2^32 −1 | True |
| MaxHTTPMessageSize | 10000000 | 4096 to 2^32 −1 | True |
| MaxIIOPMessageSize | 10000000 | 4096 to 2^32 −1 | True |
| CompleteT3MessageTimeout | 60 | 0: wait indefinitely 1 to 480 | True |
| CompleteHTTPMessageTimeout | 60 | 0: wait indefinitely 1 to 480 | True |
| CompleteIIOPMessageTimeout | 60 | 0: wait indefinitely 1 to 480 | True |
| IdleIIOPConnectionTimeout | 60 | 0: wait indefinitely 1 to 2^32 −1 | True |
| DefaultIIOPUser | Null | null: none specified string | False |
| DefaultIIOPPassword | Null | null: none specified string | False |

Implied Settings for Default Channels

| Default Channel Setting | Source |
|---|---|
| ListenPortEnabled | ServerMBean.isListenPortEnabled ( ) |
| ListenPort | ServerMBean.getListenPort ( ) |
| SSLListenPortEnabled | SSLMBean.isEnabled ( ) |
| SSLListenPort | ServerMBean.getSSL ( ) .getListenPort ( ) |
| TunnelingEnabled | ServerMBean.isTunnelingEnabled ( ) |
| T3Enabled | Not configurable, fixed to true. |
| HTTPEnabled | ServerMBean.isHttpdEnabled ( ) and ServerMBean.isTunnelingEnabled ( ) (Note that individual web apps may ignore HttpdEnable via the flag IgnoringHttpdEnabled.) |
| IIOPEnabled | ServerMBean.isIIOPEnabled ( ) |
| T3SEnabled | ServerMBean.getSSL ( ) != null |
| HTTPSEnabled | ServerMBean.isHttpdEnabled ( ) and ServerMBean.isTunnelingEnabled ( ) and ServerMBean.getSSL ( ) != null |
| IIOPSEnabled | ServerMBean.isIIOPEnabled ( ) and ServerMBean.getSSL ( ) != null |
| LoginTimeoutMillis | ServerMBean.getLoginTimeoutMillis ( ) |
| LoginTimeoutMillis | SSLServerMBean.getSSL ( ) .getLoginTimeoutMillis |
| OutgoingEnabled | Not configurable, fixed to true. |
| BoundOutgoing | Not configurable, fixed to false. |
| AcceptBacklog | ServerMBean.getAcceptBacklog ( ) |
| TunnelingClientPingSecs | ServerMBean.getTunnelingClientPingSecs ( ) |
| TunnelingClientTimeoutSecs | ServerMBean.getTunnelingClientTimeoutSecs ( ) |
| ChannelWeight | Not configurable, fixed to 50. |
| MaxT3MessageSize | KernelMBean.getMaxT3MessageSize ( ) |
| MaxHTTPMessageSize | KernelMBean.getMaxHTTPMessageSize ( ) |

-continued

| Default Channel Setting | Source |
| --- | --- |
| MaxIIOPMessageSize | KernelMBean.getMaxIIOPMessageSize ( ) |
| CompleteT3MessageTimeout | KernelMBean.getCompleteT3MessageTimeout ( ) |
| CompleteHTTPMessageTimeout | KernelMBean.getCompleteHTTPMessageTimeout ( ) |
| CompleteIIOPMessageTimeout | KernelMBean.getCompleteIIOPMessageTimeout ( ) |
| IdleIIOPConnectionTimeout | KernelMBean.getIdleIIOPConnectionTimeout ( ) |
| DefaultIIOPUser | ServerMBean.getDefaultIIOPUser ( ) |
| DefaultIIOPPassword | ServerMBean.getDefaultIIOPPassword ( ) |
| ListenAddress (NAP only field) | ServerMBean.getListenAddress ( ) |
| ExternalDNSName (NAP only field) | ServerMBean.getExternalDNSName ( ) |

Implied Settings for Default Admin Channels

The default admin channel fields are the same as the default channel fields, except for the ListenPort and SSLListenPort. Instead:

ListenPort is ignored.
SSLListenPort=ServerMBean.getAdministrationPort( )
SSLListenPortEnabled=ServerMBean.isAdministrationPortEnabled( )

The default admin channel exists if and only if the administration port is configured and the SSLMBean is configured.

Extended Server URL

In accordance with an embodiment of the invention, the URL and Context currently used today by clients to establish the initial connection to a WL server is extended to support multi-homed hosts and to support locating multiple WL servers listening on the same address but at different ports. The extended URL allows for different hosts listening on different ports and for specifying ranges of ports. Port ranges simplify the URL syntax for URLs that reference a set of hosts that all listen on the same address but on "adjacent" ports.

```
port =          [0-9] +
portSet =       portRange (+portRanqe)?
portRange =     port (-port)?
host =          (ip-address) | (host-name)
protocol =      (http|iiop|t3)s?
currentNAP =    host (,host) * (:port)?
currentURL =    (protocol://)?currentNAP
extendedNAP =   host (,host) * (:portSet?)?
extendedURL =   (protocol://)?extendedNAP (,extendedNAP) *
```

The port used for a particular host is the one that follows. If no port is specified, a default port is used. A port range, designated using a '−' sign, takes precedence over a port set, designated using a '+' sign. For example, given that t3 is the default protocol and that 7001 is the default port, the following three URLs are equivalent:

t3://host1:7001-7004,host2:7001
t3://host1:7001+7002-7004,host2:7001
host1:7001,host1:7002,host1:7003-7004,host2
host1:7002-7004,host1,host2

The following URLs are equivalent but not equivalent to the above:

host1,host2,host1:7002-7003
host1,host2:7002-7003

3. ServerMBean

The invention adds two new fields into the ServerMBean to reflect the new functions. Some existing ServerMBean fields are used for the default channel and default admin channel setup.

DefaultURLLocalAddress

This is the default local address used for new Contexts that are establishing their connection to a remote server. It supplements a URL by specifying which local address, and therefore which NIC, to which to bind. By default, this value is not specified, indicating that the O/S is responsible for choosing a local address. This value applies to both internally generated and application generated contexts that are used for connecting to remote servers when channel information is not available.

NetworkAccessPointMBeans

This is an array of NetworkAccessPointMBeans that each reference a NetworkChannelMBean. They are optional.

ListenPortEnabled/AdministrationPortEnabled

These attribute indicate whether or not the given port is enabled or not. The default for ListenPortEnabled is true and for AdministrationPortEnabled is false.

External Software Interfaces

The following attributes are new to the ServerMBean:

| Attribute | Default | Valid Values | Dynamic |
| --- | --- | --- | --- |
| DefaultURLLocalAddress | None. | Hostname or IP or DNSName | False |
| NetworkAccessPointMBeans | None | An array of network access point mbeans These are not shared between servers. | False |
| ListenPortEnabled | True | "true" or "false" | False |
| AdministrationPortEnabled | False | "true" or "false" | False |

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application server environments may use and benefit from the invention. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for server network configuration and addressing in a cluster that allows multiple network access points to be associated with server instances in the cluster, the system comprising: a plurality of computer devices, each of which includes a processor, that operate together as a cluster, and that include a plurality of software servers operating thereon as members of the cluster, wherein the cluster is enabled to receive requests from external servers and clients and then communicate the requests internally to the cluster members for processing; a software interface layer including a plurality of communications channels within the cluster, that are accessible by the plurality of software servers to communicate with one another within the cluster, and that are also accessible by external servers and clients to communicate with and send requests to the cluster; a plurality of network access points on each of the software servers within the cluster, that are used by the software servers to communicate with other software servers in the cluster and to listen to the communications channels for requests, including for each software server one or a plurality of network access points, including at least one network access point that is configured for each selected communications channel accessed by the software server, wherein each network access point defines a set of listen ports and a single listen address which, when combined, specify a network access point that is unique to that server, and wherein for a particular software server each of its plurality of network access points are identified by a combination of a listen address for the computer device on which the software server operates and a listen port selected from the set of listen ports for that server; and wherein a network request received from an external server or client by the cluster identifies uses a target server's listen port in combination with a target server's listen address in the request to determine a corresponding particular one of said the plurality of network access points at the target server, and wherein said the network request is then communicated within the cluster to the target server over the communications channel that is associated with that particular network access point.

2. The system of claim 1 wherein multiple servers are deployed within a cluster on said computer device or machine having a single network or Internet protocol address, wherein each of said plurality of network access points has one or more listen ports used in combination with said computer device's or machine's listen address.

3. The system of claim 1 wherein said the servers are an application server.

4. The system of claim 1 wherein a single communications channel between a first server and one other server or client is used.

5. The system of claim 1 wherein a first server in the cluster comprises a plurality of network interface cards, including a network interface card for each channel supported by that server.

6. The system of claim 5 wherein each one of the plurality of network cards for a particular server can be associated with a plurality of communications channels, and wherein a particular communications channel can be used to access the particular server by a client specifying the address of the network card and a port, and wherein the cluster then uses the address and port information to determine the communications channel.

7. The system of claim 1 further comprising a second plurality of network access points on said other servers and clients, each of said second plurality of network access points associated with one of said plurality of communications channels.

8. The system of claim 1, wherein no two of said plurality of network access points on a server are assigned to the same channel.

9. The system of claim 1, wherein each of said plurality of network access points is unique to exactly one server.

10. The system of claim 1 wherein the cluster comprises a cluster managed bean with a common multicast port, and wherein each member of the cluster comprises a server managed bean with its own listen address and port, and wherein the cluster managed bean allows the servers to participate in the cluster while the server managed beans allows each server to have its own listen address and port.

11. The system of claim 1 wherein the cluster receives requests in the form of a uniform resource locator that specifies a protocol type, host address and port range for the request, and wherein the host address and port range are then used by the cluster to determine the listen address and listen port of the target server and communicate the request accordingly.

12. A method for server network configuration and addressing that allows multiple network access points to be associated with a single instance of a server operating on a computer device or machine, the method comprising the steps of:

operating a plurality of computer devices, each of which includes a processor, together as a cluster, and that include a plurality of software servers operating thereon as members of the cluster, wherein the cluster is enabled to receive requests from external servers and clients and then communicate the requests internally to the cluster members for processing; providing a software interface layer including a plurality of communications channels operating within the cluster, that are accessible by the plurality of software servers to communicate with one another within the cluster, and that are also accessible by external servers and clients to communicate with and send requests the cluster; initializing a plurality of network access points on each of the software servers within the cluster, that are used by the software servers to communicate with other software servers in the cluster and to listen to the communications channels for requests, including for each software server one or a plurality of network access points, including at least one network access point that is configured for each selected communications channel accessed by the software server, wherein each network access point defines a set of listen ports and a single listen address which, when combined, specify a network access point that is unique to that server, and wherein for a particular software server each of its plurality of network access points are identified by a combination of a common listen address for the computer device on which the software server operates and a listen port selected from the set of listen ports for that server; and receiving a network request from an external server or client at the cluster that uses a target server's listen port in combination with a target server's listen address in the request to specify a particular one of said plurality of network access points at the target server, determining a corresponding particular one of the plurality of network access points at the target server, and sending the network request to the target server over the communications channel that is associated with that particular network access point.

13. The method of claim 12 further comprising deploying multiple servers within a cluster on said computer device or machine having a single network or Internet protocol address; and wherein each of said plurality of network access points has one or more listen ports used in combination with said computer device's or machine's listen address.

14. The method of claim 12 wherein said the servers are an application server.

15. The method of claim 12 wherein a single communications channel between a first server and one other server or client is used.

16. The method of claim 12 wherein a first server in the cluster comprises a plurality of network interface cards, including a network interface card for each channel supported by that server.

17. The method of claim 16 further comprising using by each of said plurality of network access points one of a unique internet protocol address and a unique network address with one of said plurality of network interface cards.

18. The method of claim 16 wherein each one of the plurality of network cards for a particular server can be associated with a plurality of communications channels, and wherein a particular communications channel can be used to access the particular server by a client specifying the address of the network card and a port, and wherein the duster then uses the address and port information to determine the communications channel.

19. The system of claim 5 wherein each of said plurality of network access points uses one of a unique internet protocol address and a unique network address with one of said plurality of network interface cards.

20. The method of claim 12 further comprising providing a second plurality of network access points on said other servers and clients, each of said second plurality of network access points associated with one of said plurality of communications channels.

21. The method of claim 12, wherein no two of said plurality of network access points on a server are assigned to the same channel.

22. A computer-readable storage medium, including instructions stored thereon which when executed by a computer cause the computer to perform the steps comprising: operating a plurality of computer devices, each includes a processor, together as a cluster, and that include a plurality of software servers operating thereon as members of the cluster, wherein the cluster is enabled to receive requests from external servers and clients and then communicate the requests internally to the cluster members for processing; providing a software interface layer including a plurality of communications channels operating within the cluster, that are accessible by the plurality of software servers to communicate with one another within the cluster, and that are also accessible by external servers and clients to communicate with and send requests the cluster; providing a plurality of network access points on each of the software servers within the cluster, that are used by the software servers to communicate with other software servers in the cluster and to listen to the communications channels for requests, including for each software server one or a plurality of network access points, including at least one network access point that is configured for each selected communications channel accessed by the software server, wherein each network access point defines a set of listen ports and a single listen address which, when combined, specify a network access point that is unique to that server, and wherein for a particular software server each of its plurality of network access points are identified by a combination of a common listen address for the computer device on which the software server operates and a listen port selected from the set of listen ports for that server; and receiving a network request from an external server or client at the cluster that uses a server's listen port in combination with a target server's listen address in the request to specify a particular one of said plurality of network access points at the target server, determining a corresponding particular one of said plurality of network access points at the target server, and sending the network request to said the target server over the communications channel that is associated with that particular network access point.

* * * * *

UNITED STATES PATENT AND TRADEMARK OFFICE
CERTIFICATE OF CORRECTION

| | | |
|---|---|---|
| PATENT NO. | : 7,484,006 B2 | Page 1 of 1 |
| APPLICATION NO. | : 10/368927 | |
| DATED | : January 27, 2009 | |
| INVENTOR(S) | : Chang et al. | |

It is certified that error appears in the above-identified patent and that said Letters Patent is hereby corrected as shown below:

In column 4, line 26, delete "ServerM Bean" and insert -- ServerMBean --, therefor.

In column 6, line 31, delete "ssl" and insert -- SSL --, therefor.

In column 8, line 51, delete "IlOPEnabled" and insert -- IIOPEnabled --, therefor.

In column 9, line 44, delete "(+portRanqe)?" and insert -- (+portRange)? --, therefor.

In column 13, line 33, in Claim 18, delete "duster" and insert -- cluster --, therefor.

Signed and Sealed this

Twenty-seventh Day of April, 2010

David J. Kappos
*Director of the United States Patent and Trademark Office*